United States Patent Office
3,273,768
Patented Sept. 20, 1966

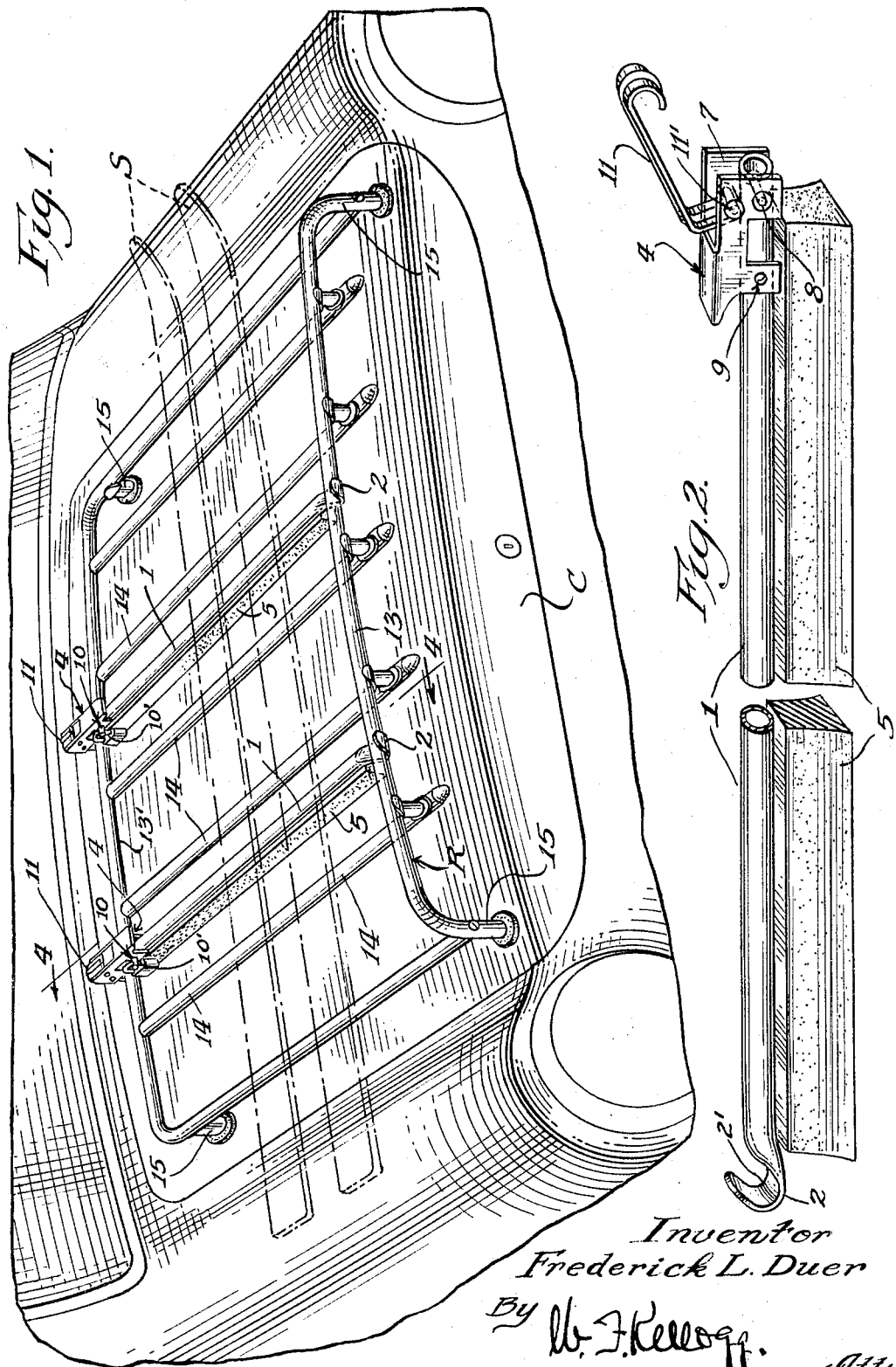

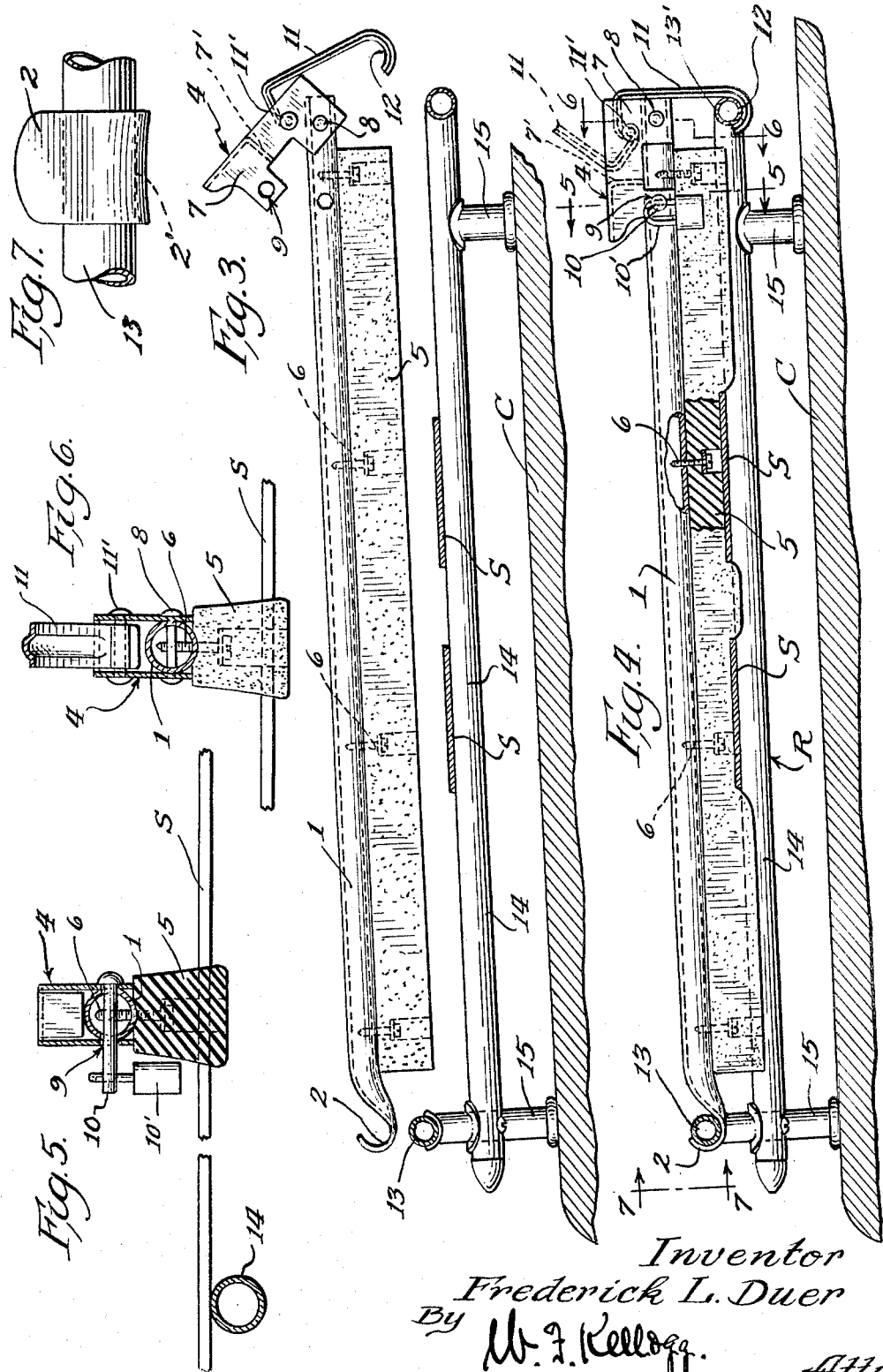

1

3,273,768
SKI CLAMP FOR AUTOMOBILE LUGGAGE RACKS
Frederick L. Duer, 2810 Madison St., Bellwood, Ill.
Filed Oct. 19, 1965, Ser No. 497,876
5 Claims. (Cl. 224—42.1)

This invention relates to the improvements in article securing devices, more particularly, to a clamp for securing skis or similar devices or equipment to the luggage racks of automobiles, especially to luggage racks which are mounted on the rear deck covers or roofs thereof.

It is an object of the invention to provide a clamp which will be advantageous for use in connection with different types of automobile bodies, roof and rear deck covers, mounted luggage carriers or racks to easily and conveniently secure skis or articles of generally similar kind, shape and size thereon and thereto in a manner which will assure their carrying and transportation without loss and without rattle; moreover, will prevent their unauthorized removal.

It is also an object of the invention to provide a device of the character stated which may be operatively attached to a luggage rack without alteration thereof and which, when not in use, can be wholly removed therefrom and placed or stored in limited space, viz., in the luggage compartments of automobiles, etc.

Yet another object of the invention is to provide an article securing clamp for vehicle luggage carriers or racks so constructed that with mounting thereon it can be pivoted to and from article (skis) clamping position without the hazard or inconvenience of unwanted detachment, yet when desired can be quickly and readily removed from a carrier, this without alteration or modification thereof.

A further object of the invention is to provide an article clamping device for automobile luggage carriers, or racks, having a novel and especially advantageous form of locking bracket, the same being quickly and positively engageable with an appropriate portion of a rack, following its mounting thereon in a manner which will assure its article clamping function and maintenance; also will maintain the same without objectionable rattling or vibration of both the clamped articles and the clamp per se.

The foregoing, as well as other objects, advantages and meritorious teachings of our invention will be in part obvious and in part pointed out in the following detailed disclosure thereof, when taken in conjunction with the accompanying drawings, it being understood that the form and the adaptation of the invention presented herein is substantially precise and what is now considered to be the best mode of embodying its principles and usages, but that other modifications, changes and usages may be made without departing from its essential features.

In the drawings:

FIGURE 1 is a perspective view showing an automobile luggage rack having a pair of my improved clamps, connected thereto and lockingly securing a pair of skis, illustrated in dotted lines, thereon;

FIGURE 2 is a perspective view of the clamp with the locking bracket in its closed position, an intermediate portion thereof being broken away for convenience of illustration;

FIGURE 3 is a side elevation of the clamp with the locking bracket in an open position and the luggage rack catch in position for engagement therewith, the rack being shown mounted on the deck lid or cover of an automobile luggage compartment, and in transverse section;

FIGURE 4 is a side elevation of the clamp in clamping or operative relation to the luggage rack and skis, the rack in transverse section and the clamp having an intermediate portion broken away and in section;

FIGURE 5 is a section taken on the line 5—5 of FIGURE 4 looking in the direction in which the arrows point;

FIGURE 6 is a section taken on the line 6—6 of FIGURE 4 looking in the direction in which the arrows point; and FIGURE 7 is an enlarged detail in end elevation showing the hook-like end engaged over a fragmental portion of the luggage rack forward rail, and its slightly transversely convexed form.

Referring to the drawings in detail, the invention comprises an elongated body (a tube or rod) 1, having one of its ends provided or formed with a hook-like end 2, the curvature of which substantially conforms to that of the luggage rack R side rails, hereinafter generally described, for snap engagement over and with the same, and its opposite end provided with a locking bracket 4 to be presently described. In order that disengagement facility will be accorded, it is preferable that the lower or bottom portion of the hook-like end 2 shall be slightly convexed as indicated at 2'. A strip of cellular resilient material, such as foam or sponge rubber or the like, indicated at 5, is secured to and longitudinally of the clamp elongated body by means of screws 6 entered into and through the same and with said body. Its length, as shown in FIGURES 2 and 3, is slightly less than that of the body. Being resilient, it is deformable, hence, when engaged transversely with and over skis S received on and longitudinally of the luggage rack R will secure and cushion the same with relation thereto (see FIGURE 3).

The locking bracket consists of a bifurcated piece (metal or other suitable material) 7, whose opposite vertical sides are spaced so as to snugly engage, at times, over the adjacent end portion of the clamp body 1 in a saddle-like manner, with its extent of engagement limited by a downwardly disposed stop 7'. The normally outer end of the piece is pivotally connected at 8 to the body end portion, while its inner end is formed with aligned openings 9 registrable with an appropriate opening in and through the body end portion. When so positioned, a pin 10 is engaged through the registering openings and is secured against removal by engaging the hasp of a lock 10' through a suitable opening in its free and extended end portion.

To effect connection between the clamp body 1 and a side rail of the luggage rack R, a catch number 11 having an angularly disposed inner end is pivotally connected at 11' to and between the opposite vertical sides of the locking bracket piece 7 inwardly of and in spaced relation to its pivotal mounting at 8 on the clamp body. The free and outer end of the member is hooked, as at 12, for snug engagement with and over said rail (see FIGURES 3 and 4). The luggage rack R may, of course, be of varying design and/or form, it being understood that the drawing shown embodiment is for purpose of illustration only. Moreover, the rack herein shown is mounted on the rear deck cover C of an automobile. It, or another design or form thereof, may be as advantageously mounted on the automobile roof. Said rack comprises a bent tubular metal frame, substantially rectangular in shape, the forward and rearward side rails 13 and 13' of which serve to fixedly mount therebetween relatively spaced and transversely disclosed metal tubes 14. The rearward rail 13' is, as shown, arranged in a plane above that of the rail 13. In consequence, it provides a stop or shoulder against which luggage etc. may engage or abut, and thus be prevented from displacement. Feet 15 are provided to the rack, facilitating its connection with the deck cover C and spacing of the transverse tubes 14 therefrom, for obvious reasons.

In usage of my improved clamp, and assuming that it it to be used for securing skis to the luggage rack R, the skis are received longitudinal thereof, as shown in dotted lines in FIGURE 1 of the drawings, preferably in substantial parallel relation. Thereupon, one or more of the clamps are engaged over and with the same. Such is effected by engaging the curved hook-like end 2 of the clamp body or bodies 1 with and about the rearward rack and rail 13', pivoting the same downwardly whereby to transversely span the rack and bring the resilient strip 5 into clamping engagement with the skis S and the locking bracket or brackets 4 and catch or catches 11' into appropriate proximity to the rack forward rail 13. The catch or catches 11 are then engaged with it, and the bracket pieces 7 swung or pivoted inwardly to their closed position shown in FIGURES 1 and 4. The hasp of the lock or locks 10' is or are then engaged through the aforesaid pin or pins 10, locking the clamp or clamps against opening or release movement.

At this point, it is of especial importance to note that because of the pivotal connection of the catch member 11 to the bifurcated piece 7 in inwardly spaced relation to its pivotal mounting, at 8, on the body end portion, when said piece is swung inwardly to a closed position the catch will be drawn inwardly to an extent entirely sufficient to effect a positive and maintained connection between it and the forward rack rail 13, hence preventing its accidental or unauthorized disconnection.

I claim:

1. In combination with a luggage rack having relatively spaced side rails:
   (a) an elongated body the length of which approximates the distance between said side rails;
   (b) one end of the body being detachably and pivotally engageable with one of the side rails for transverse spanning of the rack;
   (c) a locking bracket pivotally mounted on the opposite end of the body; and,
   (d) a catch member endwise pivotally connected to said bracket inwardly of its pivotal mounting on the opposite body end and extending outwardly therefrom.

2. In combination with a luggage rack having relatively spaced side rails:
   (a) an elongated body the length of which approximates the distance between said side rails;
   (b) one end of the body being detachably and pivotally engageable with one of the side rails for transverse spanning of the rack;
   (c) a locking bracket pivotally mounted on the opposite end of the body and swingable in parallel relation thereto and straddingly engaged therewith when in its closed position; and
   (d) a catch member endwise pivotally mounted on the bracket inwardly of its pivotal mounting on the opposite body end and extended outwardly therefrom.

3. A clamp of the character described for vehicle attached luggage racks including end and side rails, comprising:
   (a) an elongated body the length of which approximates the distance between said side rails;
   (b) one end of the body being detachably and pivotally engageable with one of the said side rails for transverse spanning of the rack;
   (c) a locking bracket pivotally mounted on the opposite end of the body; and
   (d) a catch member endwise pivotally connected to said bracket inwardly of its pivotal mounting on the opposite body end and extending upwardly therefrom.

4. A clamp of the character described for vehicle attached luggage racks including end and side rails, comprising:
   (a) an elongated body the length of which approximates the distance between said side rails;
   (b) one end of the body being detachably and pivotally engageable with one of the said side rails for transverse spanning of the rack;
   (c) a bifurcated locking bracket straddlingly and pivotally engaged with the opposite end of the body longitudinally thereof; and
   (d) a catch member endwise pivotally mounted on the bracket inwardly of its pivotal mounting on the opposite body end and extended outwardly therefrom.

5. A clamp of the character described for vehicle attached luggage racks including end and side rails, comprising:
   (a) an elongated body the length of which approximates the distance between said side rails;
   (b) one end of the body being detachably and pivotally engageable with one of the said side rails for transverse spanning of the rack;
   (c) a bifurcated locking bracket straddlingly and pivotally engaged with the opposite end of the body longitudinally thereof; and
   (d) a catch member endwise pivotally mounted on the bracket in a manner whereby when said bracket is swung upwardly with relation to the body opposite end it will be concurrently moved away therefrom and when swung downwardly with relation thereto will be concurrently moved toward the same.

References Cited by the Examiner

FOREIGN PATENTS

| | | |
|---|---|---|
| 1,004,722 | 11/1951 | France. |
| 1,014,233 | 5/1952 | France. |
| 432,271 | 3/1948 | Italy. |

GERALD M. FORLENZA, *Primary Examiner.*

F. WERNER, *Assistant Examiner.*